J. A. BISHOP.
LOCK NUT AND THE LIKE.
APPLICATION FILED JULY 14, 1917.
1,288,812.
Patented Dec. 24, 1918.
2 SHEETS—SHEET 1.
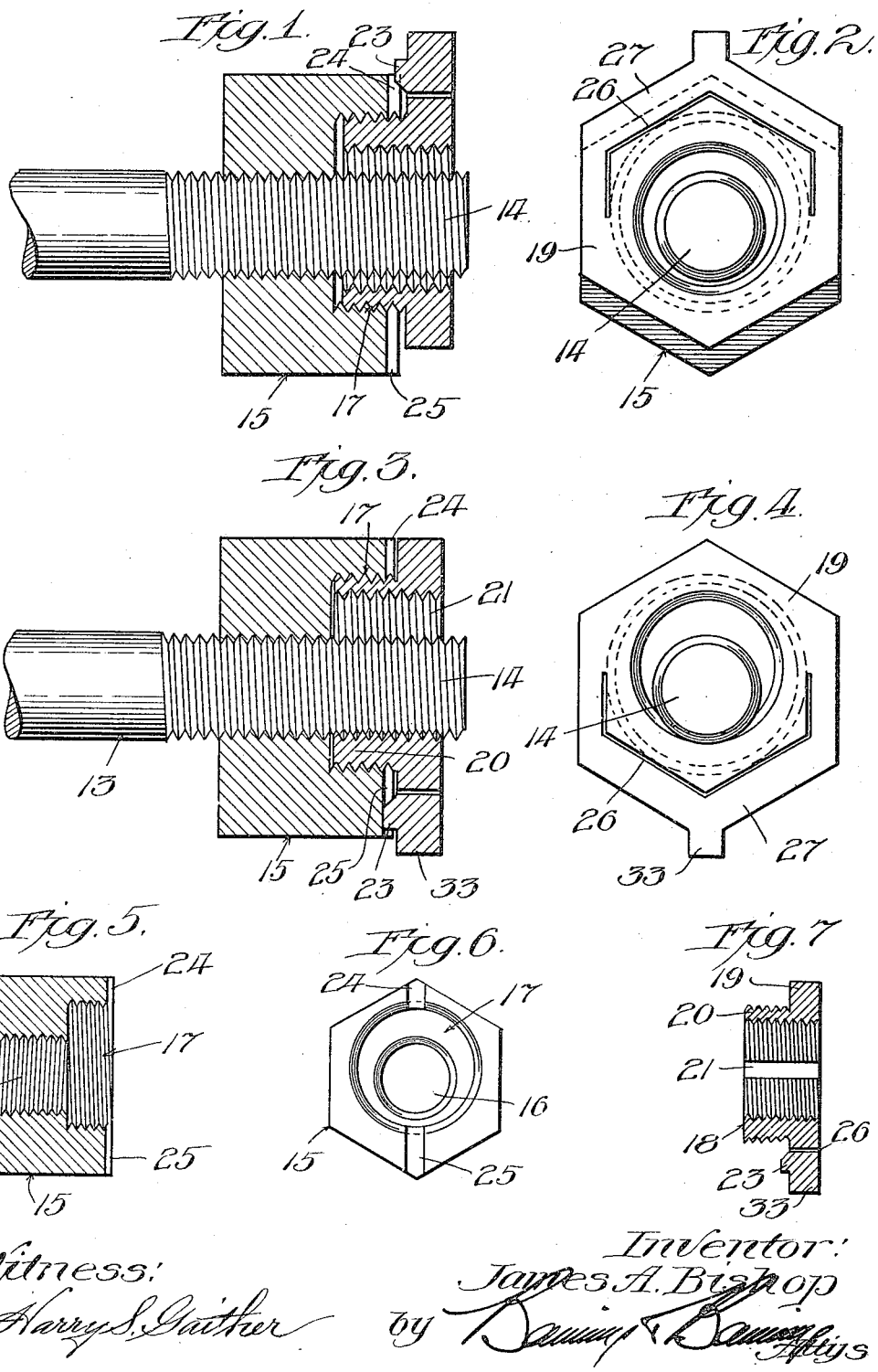
Witness:
Harry S. Gaither
Inventor:
James A. Bishop
by [signature], Attys

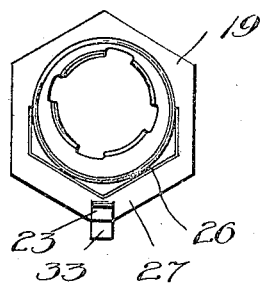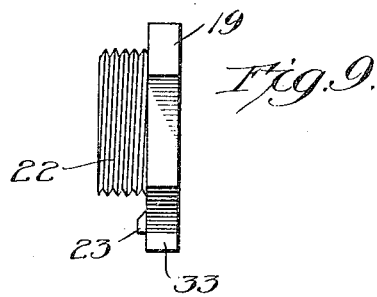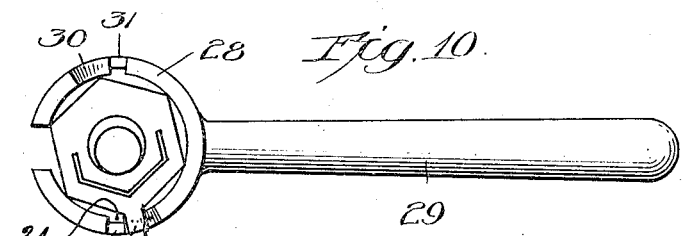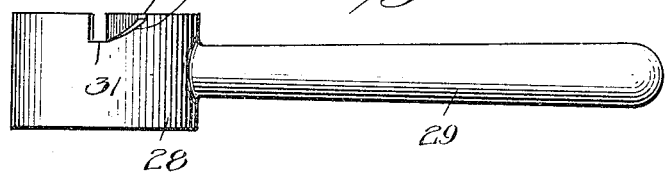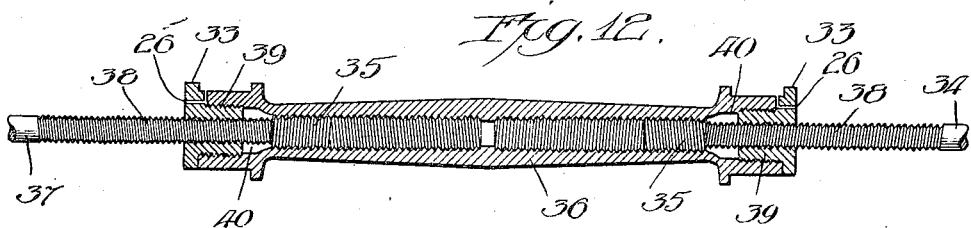

UNITED STATES PATENT OFFICE.

JAMES A. BISHOP, OF MASCOUTAH, ILLINOIS.

LOCK-NUT AND THE LIKE.

1,288,812.

Specification of Letters Patent.  Patented Dec. 24, 1918.

Application filed July 14, 1917. Serial No. 180,619.

*To all whom it may concern:*

Be it known that I, JAMES A. BISHOP, a citizen of the United States, residing at Mascoutah, county of St. Clair, and State of Illinois, have invented certain new and useful Improvements in Lock-Nuts and the like, of which the following is a specification.

The present invention has to do with certain improvements in means for locking nuts and the like to the bolts or threaded stems on which they are threaded, and for purposes of convenience in explanation I shall call the invention improvements in lock nuts, although it is to be understood that I do not thereby limit myself to any particular embodiment of the invention, nor to any particular application of its use.

The lock nut to which this invention relates is so constructed that the locking effect is secured by interlocking two contrarily threaded portions of the nut with the same bolt or shank, so that any tendency for the nut to rotate will be resisted by a tendency for the same nut to travel in both directions along the bolt or shank on which it is threaded. This being an impossible condition, the nut is, of course, locked against rotation.

The double or contrary threading above mentioned is secured in some cases by cutting or forming the threads in the bolt or shank by the very act of locking the nut thereupon, whereas in other cases said locking is secured by causing the two portions of the nut to simultaneously mesh with two previously prepared sets or groups of threads of contrary nature.

In order that the features of the invention may be better understood and appreciated by those skilled in the art, I will have reference to the drawings in which—

Figure 1 shows a cross section on enlarged scale through a lock nut embodying the features of the present invention, the two portions of said nut being disengaged or unlocked;

Fig. 2 is an end or face view corresponding to Fig. 1;

Fig. 3 is a view similar to Fig. 1, with the exception that the two portions of the nut have been locked onto the bolt or shank;

Fig. 4 is an end or face view corresponding to Fig. 3;

Fig. 5 is a cross section through the main portion of the nut on smaller scale;

Fig. 6 is an end or face view corresponding to Fig. 5;

Fig. 7 is a cross section through the locking die cam;

Fig. 8 is a bottom face view corresponding to Fig. 7;

Fig. 9 is a side elevation corresponding to Fig. 7;

Fig. 10 is an end view of a special wrench which may be used for locking and unlocking the die cam the nut being shown in position therein;

Fig. 11 is a side or face view corresponding to Fig. 10; and

Fig. 12 is a cross section through a modified form or application of the features of this invention, the modification consisting in the application of the features of invention to a turn buckle for drawing together the two portions of a turn buckle rod or the like.

Referring to the several figures, the bolt or shank in the arrangement shown in Figs. 1 to 11 inclusive is designated by the numeral 13. It is provided with the threads 14 which are ordinarily of right-hand formation, although manifestly they need not be right-hand threads. The main portion of the bolt is designated by the numeral 15. In the particular construction illustrated it is of hexagonal form, although manifestly it may be square, round, or of any other suitable contour. It is provided with the internally threaded hole 16 having threads of like form to those of the bolt or shank 14, so that it may be threaded thereupon.

In the construction illustrated the bolt 15 is peculiar in this, that it has a socket 17 in its outside end face, which socket is circular, but is eccentric as compared to the hole 16. This fact is clearly illustrated in Figs. 5 and 6. The socket 17 is provided with internal threads of contrary nature or form from the threads of the hole 16, as is well shown in Fig. 5.

In the socket or hole 17 is threaded a die cam 18. The same comprises a head portion 19 and a neck or lug portion 20 through which neck or lug portion extends an opening 21, and which neck or lug portion is eccentric with respect to the head portion 19. The head portion is preferably of contour similar to that of the main body of the nut, and in the various figures this head portion is shown as being hexagonal to correspond with the hexagonal nut. The exterior of the neck or lug portion 20 is threaded, as shown at 22 in Fig. 9, with threads of like nature to the threads of the socket 17, so that the lug can be threaded into said socket. As the die cam is rotated during this threading operation, its head portion will alternately register with and be eccentric with respect to the main portion of the nut. In Figs. 3 and 4 these parts are shown as being in registry, whereas in Figs. 1 and 2, on account of the eccentricity of the neck or lug 20, they are out of registry.

The hole or opening 21 of the die cam is eccentrically formed with respect to the axis of the socket 17, so that as the die cam is rotated in said socket, the surface of the hole 21 of the die cam will come against or even cut across the position of the bolt or shank 14. Consequently when the die cam stands in the position shown in Fig. 4, wherein it is in registry with the body portion of the nut, the surface of its opening 21 cuts across the bolt or shank, whereas when the die cam is turned in the position shown in Fig. 2, the surface of the opening 21 clears all portions of the bolt or shank. This is accomplished by making one side of the neck or lug 20 thicker than the other side thereof.

By constructing the die cam in the manner above explained, its inner surface 21 will be brought very forcibly into contact with the surface of the bolt or shank, so that the entire lock nut will be solidly held on the bolt or shank and prevent it from turning. This arrangement, however, would depend for its action entirely upon the friction of the surface of the opening 21 against the surface of the bolt or shank. In order to improve the locking action, I have formed the threads on the inner surface 21 of the neck or lug 20, which threads are in contrary direction from the threads of the bolt or shank, while being in the same direction as the threads on the surface of the socket 17. As a result of this arangement, when the eccentricity is brought into play, the threads 21 of the die cam will engage with the bolt or shank in such a manner that the entire lock nut can not be rotated on the bolt or shank, because the threads 21 being in opposite direction from the threads 16 will tend to drive the lock nut along the bolt or shank in the opposite direction, an anomalous or impossibe condition without destroying some portion of the combination.

In order to insure that the die cam will thoroughly engage the metal of the bolt or shank, I have shown the die cam as having the die cutting segments, best illustrated in Fig. 8, and said die cam may be conveniently made of hard or tempered steel, or at any rate of a harder metal than that of the bolt or shank.

When the die cam has been brought into registry with the body portion of the nut, it should be locked into such position, and I have made provision for such locking. In the particular arrangement illustrated, this locking is accomplished by the engagement of a lug 23 on the die cam with one or the other of a pair of sockets or recesses 24 and 25 on the main or body portion of the nut. The engagement of the lug 23 with the recess 24 holds the die cam in open or unlocked position, whereas its engagement with the recess 25 holds it in closed or locked position. In order to give flexibility or resiliency to the parts so as to permit the lug 23 to ride into and out of the recesses while sufficiently performing its locking function, I have provided the slot 26 in the die cam which partially severs the wing portion 27 from the remaining portion of the die cam, and permits a sufficient movement of the lug 23 with respect to the main portion of the die cam to give the desired resiliency.

In Figs. 1 and 2, the die cam is shown in unlocked position, whereas in Figs. 3 and 4 it is shown in locked position.

In order to lock the die cam it is only necessary to rotate it with respect to the main portion of a nut, but before this rotation can be accomplished, the lug must be raised away from the recess or socket in which it happens to be.

In order to accomplish these results, I have illustrated the special tool shown in Figs. 10 and 11. The same comprises a circular head portion 28 having a handle 29. The circular head portion has a central opening of internal diameter just sufficient to receive the main or body portion of the nut. It is provided with one or more cam notches 30, each having the bottom wall 31 and the working face 32. On the wing portion 27 of the die cam is provided a lifting lug 33 which extends out a slight distance beyond the head portion 19. A slot 34 is provided in the head portion 28 of the tool, so that its head 28 can be set down into place around the main portion 15 of the nut. Then upon rotating the tool, the cam surface 30 will be forced under the lifting lug 33 so as to deflect the wing portion 27, thereby disengaging the lug 33 from the recess into which it is engaged. After this disengagement has taken place, the working face 32 of the notch of the tool will engage the side face of the lifting lug for the purpose of rotating the die cam.

In the embodiment of my invention hereinbefore described, the contrary threading engagement of the die cam with the bolt or shank is automatically accomplished by the very act of turning the die cam into the locking position. That is to say, the act of turning the die cam serves in itself to cut the contrary threads in the bolt or shank held in engagement with the contrary threads of the die cam. The performance of this operation necessarily involves a very severe side pressure on the bolt or shank, so that this embodiment of the invention cannot be successfully applied, unless there is sufficient stiffness to the bolt or shank to sufficiently resist this side pressure.

In many cases, the bolt or shank will not be of sufficient stiffness to insure a satisfactory cutting of the threads in this manner. This might be true, for example, in the case of turn buckles applied to tension wires in aeroplane construction. In this case the bolt or shank would comprise a portion of the piano wire which is very hard and of insufficient stiffness to successfully resist the aforementioned side pressure. I, therefore, have illustrated in Fig. 12 a modified application of the features of this invention. This modification consists in the pre-preparing of the contrary threads in the bolt or shank, so that said threads do not need to be cut by the turning of the cam. For example, the wire 34 has its end portion 35 threaded in the usual manner for engagement with a turn buckle 36. By turning the turn buckle the tightening or loosening of the wire 34 with respect to the complementary wire 37 is accomplished. The body portion 38 of the wire 34 is of reduced diameter and is provided with threads of a contrary nature to the threads 35. The auxiliary locking portion 39 is provided on its interior with threads of a contrary nature meshing with the threads 38 and said portion 39 is provided on its exterior portion with threads also of a contrary nature meshing with threads of a contrary nature in the socket 40 of the turn buckle. The locking portion 39 can be locked with respect to the turn buckle 36 in any desired manner, as, for example, by the use of a lug and notch construction similar to that already explained. In the arrangement shown in Fig. 12 it is unnecessary for the bore of the block 39 to be eccentrically formed for the reason that the threads 38 have been pre-prepared or prepared in advance.

When using the arangement shown in Fig. 12, the locking portion 39 is threaded backward along the portion 38 of the shank until it is disengaged from the main portion of the nut. The nut is then turned with respect to the shank or bolt to the proper point, and then the locking portion 39 is threaded down along the shank 38 and into the socket 40 until it is locked with respect to the main portion of the nut. When said locking takes place, it is impossible to turn the nut on the shank without first disengaging the locking portion 39 from the nut, or without stripping the threads.

While I have herein shown and described certain embodiments of the features of my invention, still I do not limit myself except as I may do so in the claims.

I claim:

1. In a device of the class described, the combination with a bolt or shank having external threads of one characteristic, of a nut having internal threads of similar characteristic threaded onto said bolt or shank, there being an internally threaded recess or socket in one end of the nut, the internal threads of said socket being of opposite characteristic from the threads of the nut and of the bolt, a locking member having a lug on one of its ends adapted to thread into the socket of the nut and having threads of the same characteristic as the socket, said locking member being provided with a hole for the accommodation of the bolt, said hole being internally threaded with threads of characteristic contrary to the bolt threads of the nut, and means for securing the locking member against rotation with respect to the nut, substantially as described.

2. In a device of the class described, the combination with a bolt or shank having external threads of one characteristic, of a nut threaded thereon with internal threads of the same characteristic, there being a circular recess or socket formed in one end of the nut eccentrically with respect to the axis of the bolt or shank, a circular locking member seated in said socket, said locking member being provided with an eccentrically formed through opening having on its interior threaded cutting dies of opposite characteristic from the threads of the nut and of the bolt for engagement with the surface of the bolt or shank, and means for securing the locking member to the nut and against rotation with respect thereto, substantially as described.

3. In a device of the class described, the combination with a bolt or shank having external threads of one characteristic, of a nut threaded thereon with internal threads of the same characteristic, there being a circular recess or socket in one end of the nut eccentrically formed with respect to the bolt or shank, a locking member working in said socket and having a through opening for the accommodation of the bolt or shank, said locking member being provided on its interior with threads for engagement with the bolt or shank and of opposite characteristic from the threads of the nut and of the bolt, substantially as described.

JAMES A. BISHOP.

Copies of this patent may be obtained for five cents each, by addressing the "Commissioner of Patents, Washington, D. C."